(12) United States Patent
Stickles et al.

(10) Patent No.: US 10,919,454 B2
(45) Date of Patent: Feb. 16, 2021

(54) UNIVERSAL POWERBOARD LINKAGE

(71) Applicant: Bestop, Inc., Louisville, CO (US)

(72) Inventors: George C. Stickles, Thornton, CO (US); Frank A. Borke, Greeley, CO (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 16/884,702

(22) Filed: May 27, 2020

(65) Prior Publication Data

US 2020/0282915 A1    Sep. 10, 2020

Related U.S. Application Data

(63) Continuation of application No. 16/567,627, filed on Sep. 11, 2019, now Pat. No. 10,696,233, which is a continuation of application No. 16/036,476, filed on Jul. 16, 2018, now Pat. No. 10,449,905, which is a continuation of application No. 15/682,006, filed on Aug. 21, 2017, now Pat. No. 10,040,396, which is a continuation of application No. 15/082,845, filed on Mar. 28, 2016, now Pat. No. 9,764,691.

(60) Provisional application No. 62/139,100, filed on Mar. 27, 2015.

(51) Int. Cl.
*B60R 3/00* (2006.01)
*B60R 3/02* (2006.01)

(52) U.S. Cl.
CPC ................................. *B60R 3/02* (2013.01)

(58) Field of Classification Search
CPC ............ B60R 3/00; B60R 3/002; B60R 3/005; B60R 3/02
See application file for complete search history.

(56) References Cited

U.S. PATENT DOCUMENTS

| 7,503,572 | B2* | 3/2009 | Park | B60R 3/02 |
| | | | | 280/163 |
| 2015/0123374 | A1* | 5/2015 | Smith | B60R 3/002 |
| | | | | 280/166 |
| 2017/0355315 | A1* | 12/2017 | Leitner | B60R 3/02 |

* cited by examiner

*Primary Examiner* — Bryan A Evans
(74) *Attorney, Agent, or Firm* — Warn Partners, P.C.

(57) ABSTRACT

A universally mountable articulating step for a vehicle which includes a bypass linkage set which is common to mounting in a plurality of vehicles. The linkage set includes front and rear casting members that enable the step to collapse on itself. An independent mounting adapter which is unique to a particular vehicle is provided including a mounting configuration adapted to be attached to a vehicle and attachment mounting locations on which the bypass linkage set is to be mounted.

20 Claims, 7 Drawing Sheets

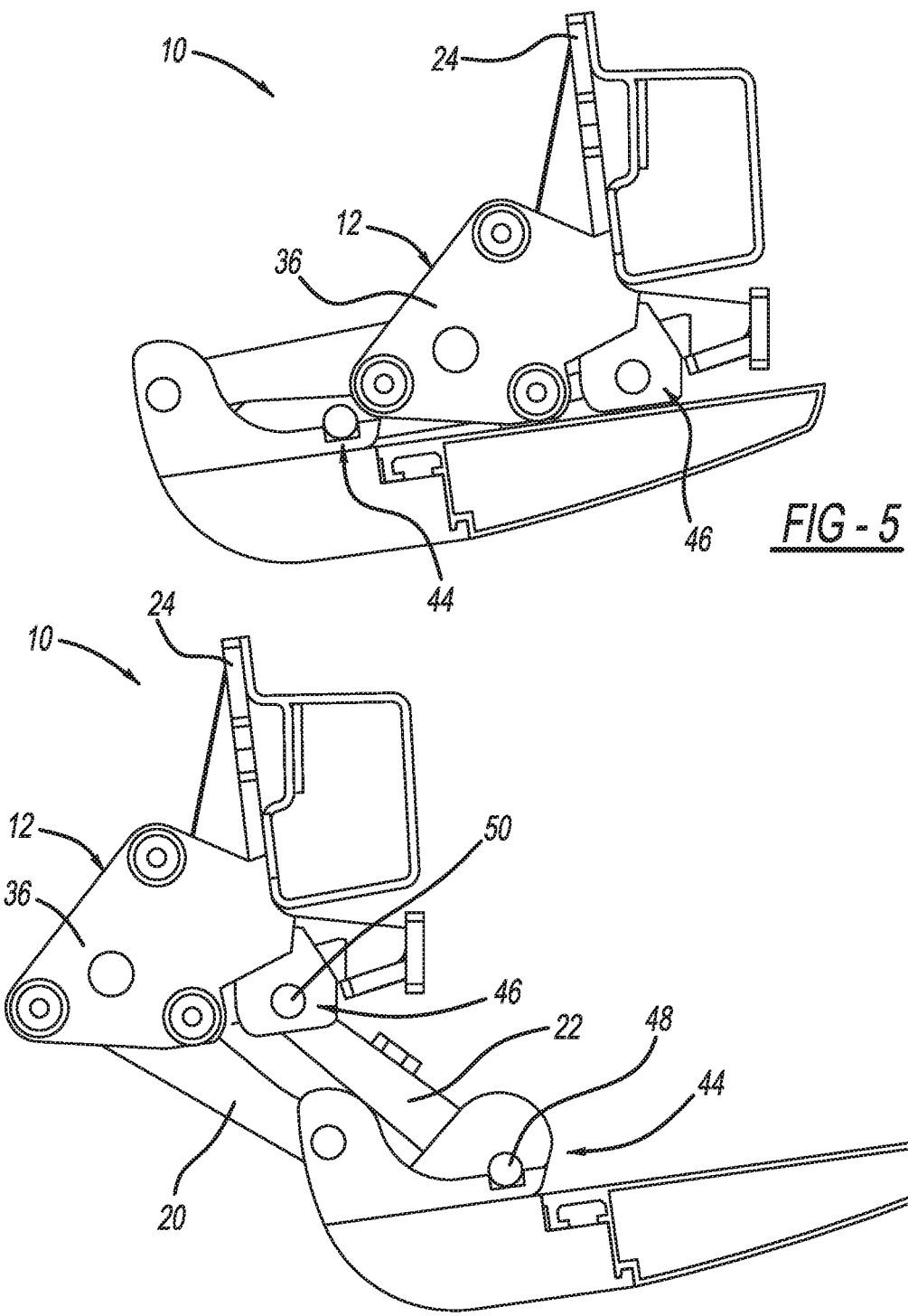

US 10,919,454 B2

UNIVERSAL POWERBOARD LINKAGE

CROSS REFERENCE TO RELATED APPLICATIONS

This application is a continuation of U.S. patent application Ser. No. 16/567,627, filed Sep. 11, 2019, which is a continuation of U.S. patent application Ser. No. 16/036,476, filed Jul. 16, 2018, now U.S. Pat. No. 10,449,905, issued Oct. 22, 2019, which is a continuation of U.S. patent application Ser. No. 15/682,006, filed Aug. 21, 2017, now U.S. Pat. No. 10,040,396, issued Aug. 7, 2018, which is a continuation of U.S. patent application Ser. No. 15/082,845, filed Mar. 28, 2016, now U.S. Pat. No. 9,764,691, issued Sep. 19, 2017, which claims the benefit of U.S. Provisional Application No. 62/139,100, filed Mar. 27, 2015. The disclosures of the above applications are incorporated herein by reference.

FIELD OF THE INVENTION

The present invention relates to a mounting system for a retractable vehicle step.

BACKGROUND OF THE INVENTION

Static running boards are known to those skilled in the art. These steps are added to vehicles to provide a side step surface into a cab, but they do not retract out of the way when not in use.

Current electrical steps are also known to those skilled in the art. These step systems are added to vehicles in production and in the aftermarket to provide a step which folds down when a passenger or driver enters the vehicle. The step also retracts and is hidden out of the way when not in use.

Current vehicle electrically retractable steps require unique linkage mounts for each individual vehicle type. This adds to the cost and complexity of the production and implementation of the steps.

Therefore, there remains a need in the art to provide an electrical or otherwise articulating step which provides a method for mounting of a single construction of an electrical articulating step to step into/out of various vehicles.

SUMMARY OF THE INVENTION

A universally mountable articulating step for a vehicle which includes a bypass linkage set which is common to mounting in a plurality of vehicles. The linkage set has front and rear casting members that enable the step to collapse on itself and includes a mounting plate portion. A plurality of independent mounting adapters is provided, where each adaptor is unique to one or more particular vehicle. Each mounting adapter includes a mounting configuration adapted to be attached to a vehicle and attachment mounting locations on which the bypass linkage set is to be mounted.

The universally mountable articulating step is preferably an aluminum cast assembly which incorporates a mounting surface and system of brackets to incorporate several applications of powerboards. Powerboards generally lower as the vehicle doors open and retract as they close, or when otherwise actuated, maintaining the vehicle's ground clearance when the step is not in use. The universally mountable articulating step is designed to be fastened to any of a multitude of current and future OEM Pickup/SUV/truck side mounting step surfaces/panels/frames. A universal mounting bar, which could mount to many body styles but is costly due to size requirements of the bar, is not required by the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a side view of the universally mountable articulating step for a vehicle of the present invention showing the assembly in the retracted position; and, FIG. 6 is a side view of the universally mountable articulating step for a vehicle of the present invention showing the assembly in the extended position;

DETAILED DESCRIPTION OF THE PREFERRED EMBODIMENTS

The following description of the preferred embodiment(s) is merely exemplary in nature and is in no way intended to limit the invention, its application, or uses.

Referring now to FIGS. 1-8 a universally mountable articulating step assembly generally shown at 10 for a vehicle is provided. Preferably the articulating step assembly 10 is electronically actuated by an electrical motor assembly from a stowage or retracted position (as shown in FIG. 5), to a deployed or extended position, (as shown in FIG. 6). However, it is to be readily appreciated that other methods of actuation of the step is within the scope of the present invention such as hydraulic, pneumatic or other motors or actuation cylinders.

Figure 1:
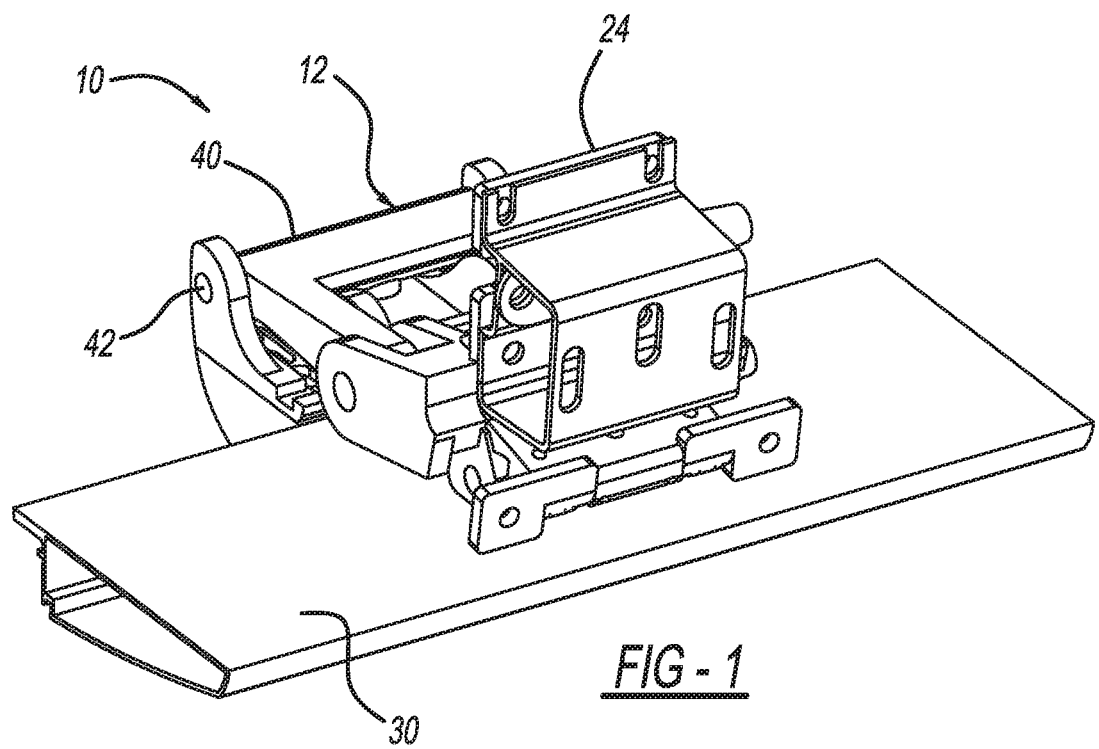
FIG. 1 is a top side perspective view of the universally mountable articulating step for a vehicle, in accordance with the present invention.
Figure 2:
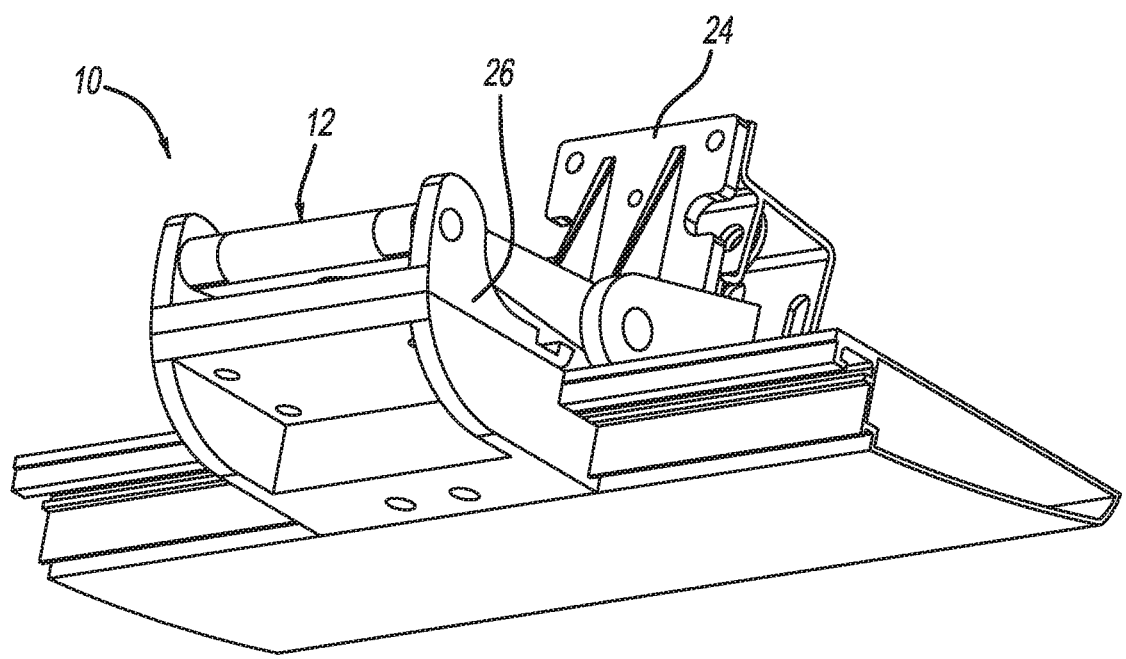
FIG. 2 is a bottom rear perspective view of the universally mountable articulating step for a vehicle of the present invention.
Figure 3:
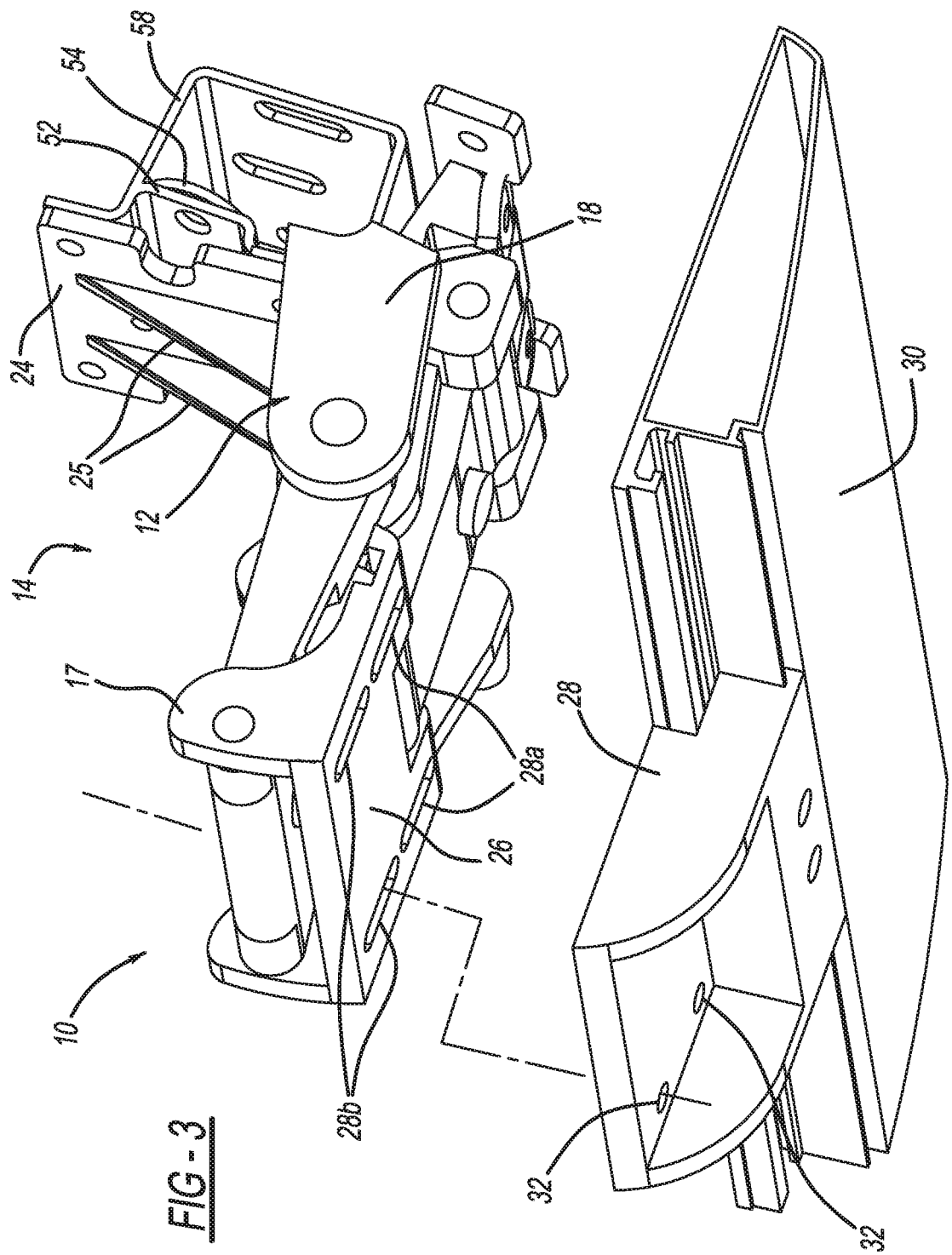
FIG. 3 is an exploded view of the universally mountable articulating step for a vehicle of the present invention showing the adjustable step plate attachment.
Figure 4:
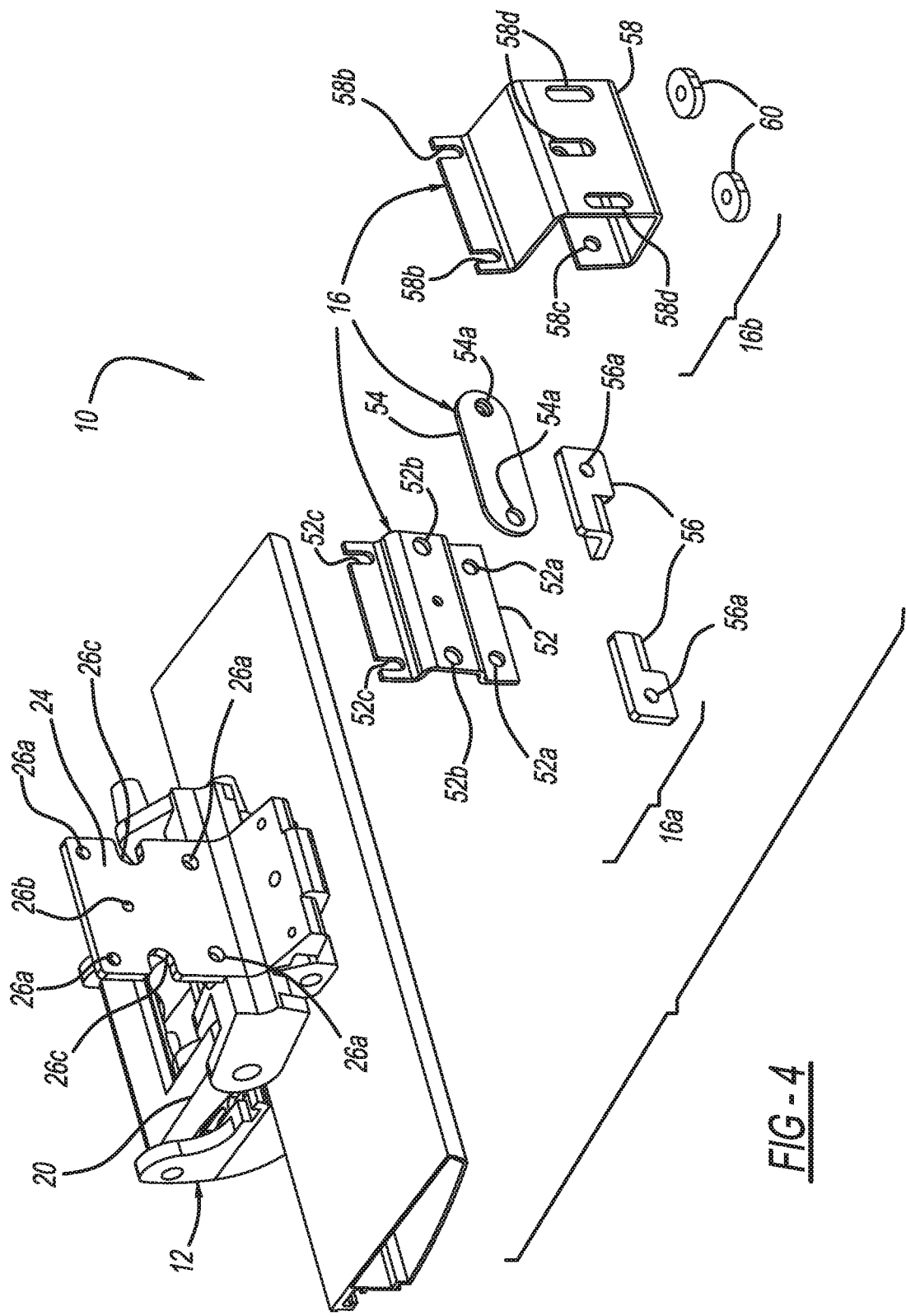
FIG. 4 is an exploded perspective view showing mounting adapter plates of the universally mountable articulating step for a vehicle of the present invention.
Figure 7:
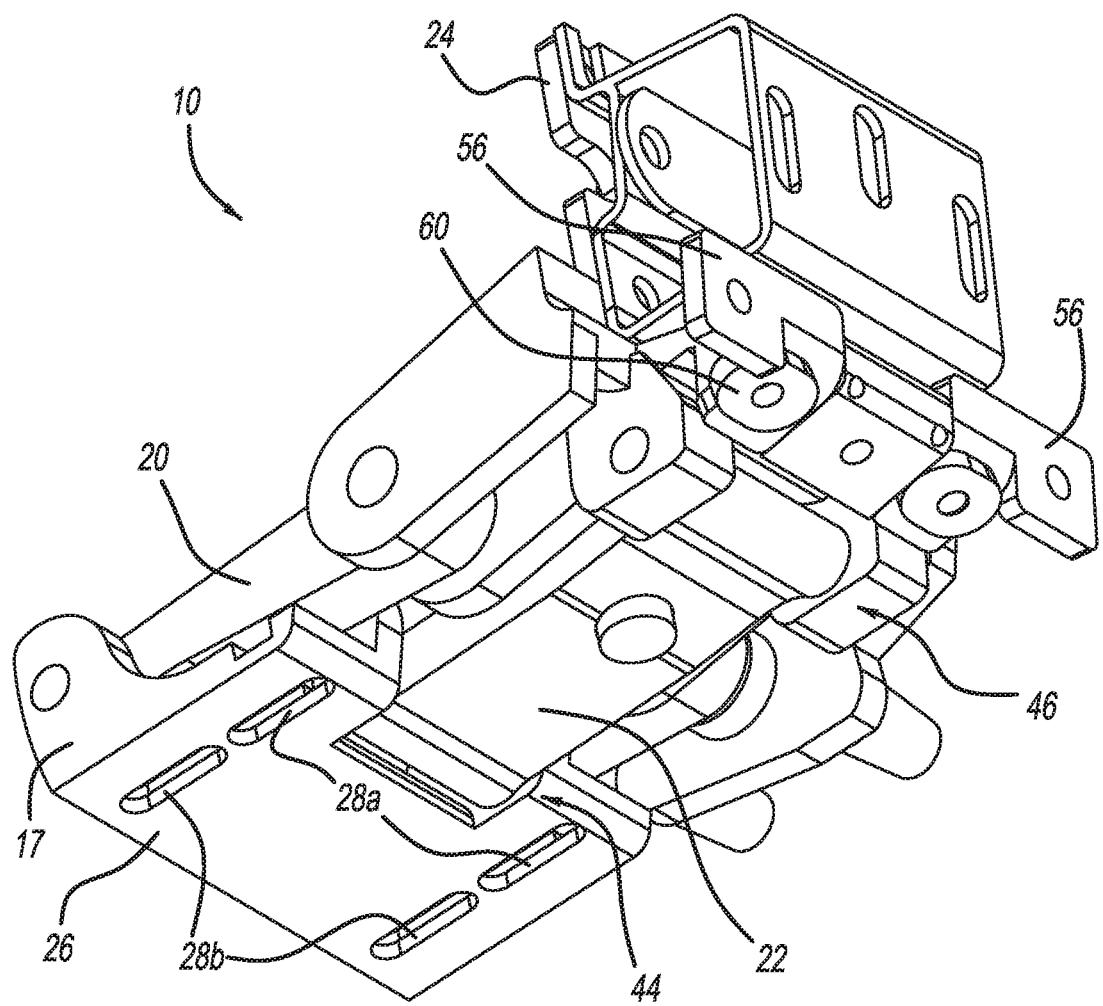
FIG. 7 is a bottom perspective view of the universally mountable articulating step for a vehicle of the present invention.
Figure 8:
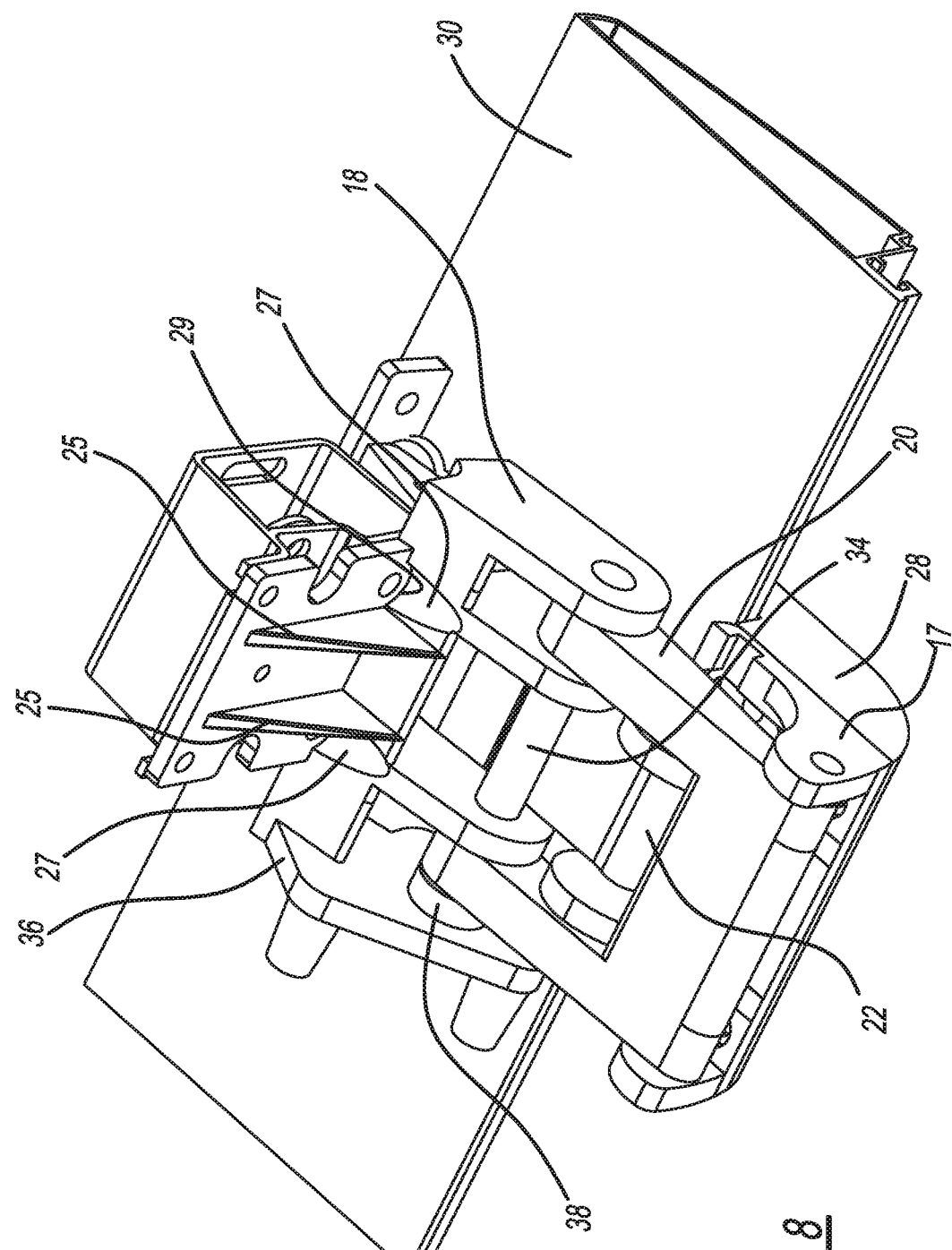
FIG. 8 is a top rear perspective view of the universally mountable articulating step for a vehicle of the present invention; and, FIG. 9 is a perspective view of a universally mountable articulating step for attachment to a vehicle panel or frame according to an embodiment of the present invention.

The articulating step assembly 10 includes a bypass linkage set general indicated at 12, an adjustable tread foot generally indicated at 14 and a plurality of mounting adapters generally indicated at 16. The adjustable tread foot 14 enables a step portion 30, e.g., an extruded step, to retract under the vehicle, preferably, enabling the step 30 to move further under the vehicle pinch weld to hide the step 30 or to be set further to the outside of the vehicle pinch weld providing more step access. At least one mounted unit is provided for each step or power running board system connected to the vehicle. In an alternative embodiment, one or more unit is provided for connection to the vehicle, which step is static in this alternative embodiment. In a preferred embodiment, the step is provided with two units mounted to the vehicle (as shown in FIG. 8).

The bypass linkage set 12 of the articulating step assembly 10 is common to mounting in a plurality of vehicles. The bypass linkage set 12 includes front 17 and rear 18 casting members that enable the step to collapse on itself. The casting members are connected by first 20 and second 22 actuation arms. The actuation arms 20,22 nest into one another upon collapsing which allows for a minimum thickness profile of the assembly in the collapsed position. This feature is important to allowing uses on various vehicles in a single unit. The actuation arms 20,22 when coupled with a suitable drive or motor provides the actuation of the step from the retracted to the extended position. The step assembly 10 includes a mounting plate portion 24 and a step attachment portion 26.

The mounting plate portion 24 is connected to, or alternatively integrally formed with, the rear casting member 18 of the bypass linkage set 12. Preferably, a plurality of fins 25 or webs are provided on the mounting plate portion 24. The fins 25 engage against, or are operably connected to or integrally formed with, the top of the rear casting member 18 to provide additional strength to the upstanding mounting plate portion 24. The rear casting member 18 is also provided with one or more, preferably two, channels 27 that each receive a respective protuberance 29 on the bottom edge of the mounting plate portion 24.

Independent mounting adapters 16 which are unique to particular vehicles are provided as set forth above. Each adapter 16 includes a mounting configuration adapted to be attached to a particular vehicle and mounting portion 24. The mounting portion 24 includes the proper holes for mounting directly to a preselected vehicle. In this case the apertures 26a, 26b and 26c in the mounting plate 24 adapt the articulated step to be mounted directly to one or more predetermined vehicle(s), e.g., predetermined pickup truck, such that no mounting adapter 16 is required (see FIG. 4). Adapter set 16a provides the proper attachment to another one or more predetermined vehicle(s). Adapter 16b provides attachment to yet another one or more predetermined vehicle(s). Thus, the selection between mounting face of the mounting portion 24 for direct mounting, adapter set 16a or adapter set 16b is made based on the particular preselected vehicle(s). It is to be appreciated that the present invention is readily adapted for use in future models, makes and years by merely designing further adapter brackets to fit any particular model, make or year vehicle as desired.

According to one embodiment, the adapter set 16a includes first and second brackets 52,54 operably attached together and to the mounting plate 24 with a plurality of fasteners, and a pair of third brackets 56 each operably coupled with at least one fastener through apertures 56a. Preferably first bracket apertures 52a and 52c align with apertures 26a of the mounting plate 24, and apertures 52b align with apertures 26c of the mounting plate 24 and second bracket apertures 54a. According to an embodiment, adaptor 16b includes a fourth bracket 58 having a plurality of elongated slots 58a and 58b and apertures 58c, and a pair of fifth brackets 60 each operably coupled with at least one fastener through apertures. With this arrangement mounting can generally be varied up or down to customize the mounting position of the final vehicle application. Preferably the elongated slots 58a, 58b align with apertures 26b, 26c and upper 26a, and the apertures 58c align with lower 26a apertures.

A plurality of mounting fasteners corresponding with the apertures/slots are used to operably mount the step assembly 10 to the vehicle, e.g., bolts, press in studs, or any other suitable fasteners and combinations thereof. It is readily appreciated that more or less than the depicted apertures in the mounting plate 24 and adapters 16a, 16b are contemplated without deviating from the scope of the invention.

Step attachment portion 26 includes sets of elongated slots 28a and 28b which are used to fasten the step portion 30 having mounting holes 32 to the step attachment portion 26. With this arrangement out board final step position can be varied in or out to customize the step position of the final vehicle application. Preferably the step portion 30 is provided with a step mounting portion 28 or trade foot mounting portion which has the mounting holes 32 to fasten to the first casting member 17, e.g., with a plurality of fasteners.

In operation, the adapter set is selected for the particular vehicle on which the step is to be installed. The adapter is mounted to the vehicle with the step attached and the step is adjusted to the proper position in the extended position on the vehicle.

The bypass linkage set 12 is also provided with a first rod 34 and a bracket 36. The first actuation arms 20 form a generally U-shaped linkage that is rotatably coupled to the rear casting member 18 by the first rod 34, which first rod 34 extends through the distal ends of the first actuation arms 20, second casting member 18 and the bracket 36 thereby connecting these components together such that the first actuation arms 20 are disposed between the second casting member 18 and bracket 36. Preferably a spacer 38 is provided between the bracket 36 and the first actuation arms 20 suitable to assist with smoother movement of the bypass linkage set 12. The proximal portion 40 of the first actuation arms 20 is operably connected to the first casting member 17 by a second rod 42.

The bracket 36 can be provided on either side of the bypass linkage set 12 without departing from the scope of the present invention.

The second actuation arm 22 is operably connected to the first and second casting members 17,18 at first and second pivot joints generally indicated at 44 and 46. Preferably by third and fourth rods 48 and 50 respectively connecting a first end of the actuation arm 22 to opposing features of the first casting member 17 and a second end of the actuation arm 22 to opposing features of the second casting member 18.

It will be readily appreciated that the electronic connection to the vehicle is also accomplished as is known in the art.

The step portion is preferably automatically extended when a predetermined condition occurs, preferably when the vehicle door is open. According to an embodiment of the present invention at least one sensor is provided for detecting when the door is in the open position or closed position. The sensor(s) is a magnetic proximity sensor, an electric sensor, a photo electric sensor or any other suitable sensor and combinations thereof. However, it is to be readily appreciated that other sensors or switches are within the scope of the present.

Figure 9:
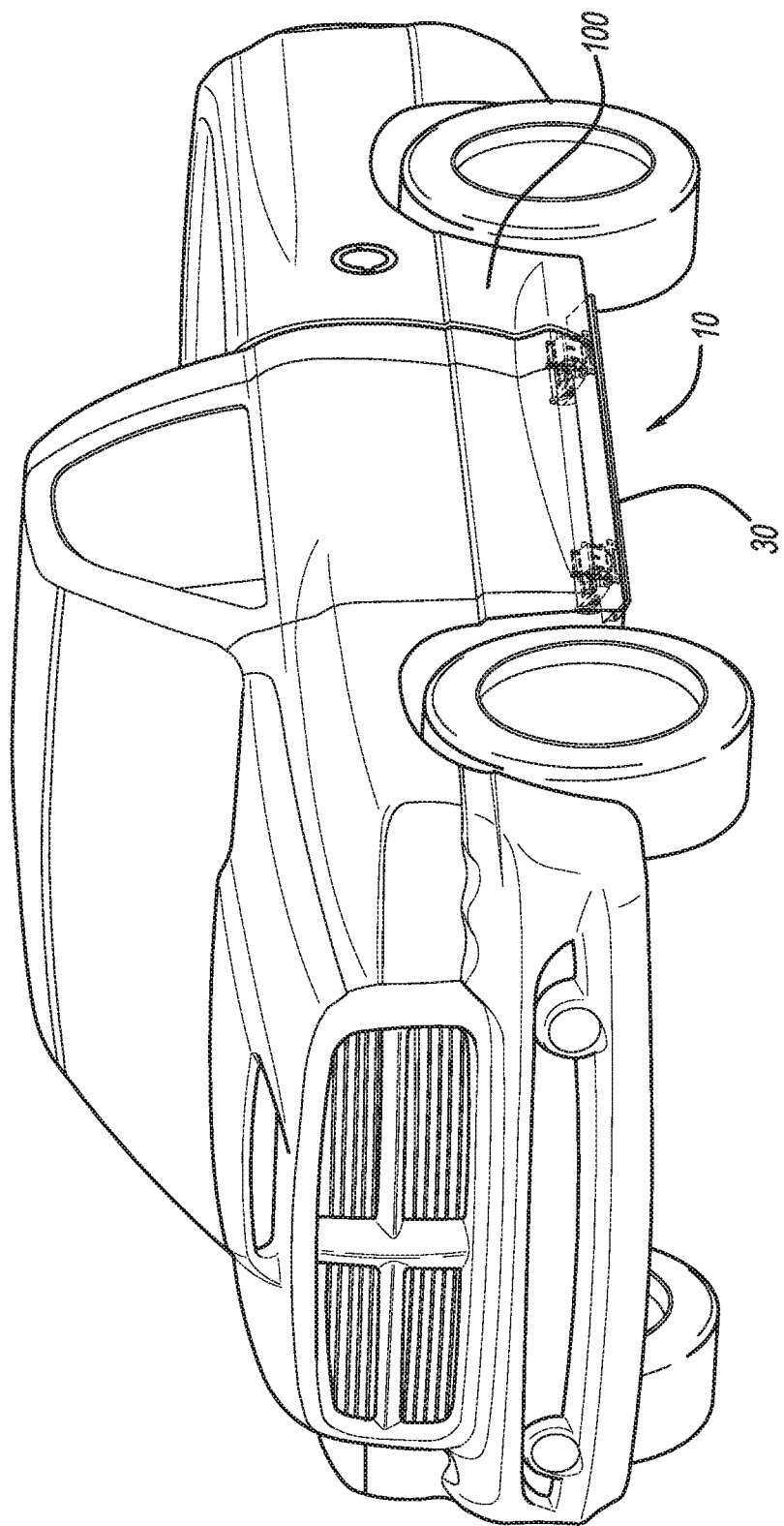

FIG. 9 is a perspective view of the universally mountable articulating step assembly 10 in an environment of use, where the step assembly is attached to a pickup truck 100. According to the present invention the step assembly is operably mounted to a vehicle panel and/or frame or other component(s) suitable for holding the step for use in/out of the cab or step up to cargo bed. However, it is to be readily appreciated that more or less mountable units or other mounting locations of the step is within the scope of the present.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A universally mountable articulating step assembly for vehicles, comprising:
    a bypass linkage set which is common to mounting in a plurality of vehicles, the bypass linkage set adapted to collapse on itself to move a step portion between extended and retracted positions, the bypass linkage set including a mounting plate portion;
    an independent mounting adapter which is unique to a particular vehicle including a mounting configuration adapted to be attached to the vehicle and attachment mounting locations on which the bypass linkage set is to be mounted.

2. The universally mountable articulating step assembly of claim 1, wherein the bypass linkage set further includes a tread foot mounting portion with a variety of preselected positions for mounting of a tread foot and a tread foot mounted thereto.

3. The universally mountable articulating step assembly of claim 1, wherein the bypass linkage set further includes front and rear casting members that enable the articulating step to collapse on itself.

4. The universally mountable articulating step assembly of claim 1, further comprising first and second actuation arms operably connected to first and second casting members operable to enable the articulating step to collapse on itself, where the first and second arms nest into one another upon collapsing to allow for minimal height profile of the articulating step assembly when in the retracted position.

5. The universally mountable articulating step assembly of claim 4, wherein the first actuation arm forms a substantially U-shaped linkage.

6. The universally mountable articulating step assembly of claim 1, wherein the mounting plate portion is provided on the rear casting member.

7. The universally mountable articulating step assembly of claim 1, wherein the mounting plate portion has a plurality of apertures, wherein the plurality of apertures adapt the articulating step assembly to be mounted directly to the vehicle.

8. The universally mountable articulating step assembly of claim 1, wherein the independent mounting adaptor further comprises:
    at least one first bracket having a plurality of apertures, and/or
    at least one second bracket having a plurality of apertures, wherein the first and second brackets are operably fastened to one another and to the mounting plate portion to provide a mounting configuration for mounting the articulating step assembly to the particular vehicle.

9. The universally mountable articulating step assembly of claim 8, wherein the independent mounting adaptor further comprises a pair of third brackets operably coupled to the bypass linkage set and/or vehicle in mounting the articulating step assembly.

10. The universally mountable articulating step assembly of claim 1, wherein the independent mounting adaptor further comprises at least one fourth bracket having a plurality of elongated slots and apertures, wherein the fourth bracket is operably fastened to the mounting plate portion to provide a mounting configuration for mounting the articulating step assembly to the particular vehicle.

11. The universally mountable articulating step assembly of claim 10, wherein the independent mounting adaptor further comprises a pair of fifth brackets operably coupled to the bypass linkage set and/or vehicle in mounting the articulating step assembly.

12. The universally mountable articulating step assembly of claim 1, further comprising a step attachment portion having at least two sets of elongated slots to operably fasten the step portion, having mounting apertures, to the step attachment portion.

13. A universally mountable articulating step assembly for a vehicle, comprising:
    a bypass linkage set which is common to mounting in a plurality of vehicles, the bypass linkage set including front and rear casting members that enable the step to collapse on itself, and the bypass linkage set including a mounting plate portion;
    an independent mounting adapter which is unique to a particular vehicle including mounting configuration adapted to be attached to a vehicle and attachment mounting locations on which the bypass linkage set is to be mounted.

14. The universally mountable articulating step of claim 13, wherein the bypass linkage set further includes a tread foot mounting portion with a variety of preselected positions for mounting of a tread foot and a tread foot mounted thereto.

15. The universally mountable articulating step assembly of claim 13, further comprising first and second actuation arms operably connected to the first and second casting members operable to enable the articulating step to collapse on itself, where the first and second arms nest into one another upon collapsing to allow for minimal height profile of the articulating step assembly when in the retracted position.

16. The universally mountable articulating step assembly of claim 15, wherein the first actuation arm forms a substantially U-shaped linkage, where the linkage is rotatably connected by first and second rods, and wherein the first rod is operably connected to the rear casting member and the second rod is operably connected to the front casting member.

17. The universally mountable articulating step assembly of claim 13, wherein the mounting plate portion has a plurality of apertures, wherein the plurality of apertures adapt the articulating step assembly to be mounted directly to the vehicle.

18. The universally mountable articulating step assembly of claim 13, wherein the independent mounting adaptor further comprises:
    at least one first bracket having a plurality of apertures,
    at least one second bracket having a plurality of apertures, and,
    a pair of third brackets operably coupled to the bypass linkage set and/or vehicle in mounting the articulating step assembly,
    wherein the first and second brackets are operably fastened to one another and to the mounting plate portion to provide a mounting configuration for mounting the articulating step assembly to the particular vehicle, and the pair of third brackets operably coupled to the bypass linkage set and/or vehicle in mounting the articulating step assembly.

19. The universally mountable articulating step assembly of claim 13, wherein the independent mounting adaptor further comprises at least one fourth bracket having a plurality of elongated slots and apertures, wherein the fourth bracket is operably fastened to the mounting plate portion to provide a mounting configuration for mounting the articulating step assembly to the particular vehicle, and a pair of fifth brackets operably coupled to the bypass linkage set and/or vehicle in mounting the articulating step assembly.

20. A universally mountable articulating step assembly for vehicles, comprising:

a bypass linkage set which is common to mounting to a plurality of vehicles, the bypass linkage set including front and rear casting members that enable the step to collapse on itself to move a step portion between extended and retracted positions, the bypass linkage set including a mounting plate portion;

a step mounting portion operably connected to the step portion, the step mounting portion having a plurality of mounting holes, a step attachment portion provided on the bypass linkage set, the step attachment portion having at least two sets of elongated slots adapted to operably fasten the step mounting portion to the bypass linkage set, and, a plurality of apertures provided in the mounting plate portion of the bypass linkage set, wherein the plurality of apertures adapt the articulating step assembly to be mounted directly to the vehicle or directly to at least one independent mounting adapter which is/are unique to particular vehicles, wherein each independent mounting adapter includes a mounting configuration adapted to be attached to the particular vehicle and attachment mounting locations on which the mounting plate portion of the bypass linkage set is to be mounted.

* * * * *